United States Patent Office 3,415,768
Patented Dec. 10, 1968

3,415,768
POLYURETHANES PREPARED FROM CHAIN-EXTENDERS HAVING N-ALKOXY METHYL GROUPS
Dieter Dieterich, Leverkusen, Wolfgang Keberle, Bergisch-Neukirche, and Erwin Muller, Leverkusen, Germany, assignors to Farbenfabriken Bayer Aktiengesellschaft, Leverkusen, Germany, a corporation of Germany
No Drawing. Filed June 3, 1966, Ser. No. 555,004
Claims priority, application Germany, June 5, 1965, F 46,274
7 Claims. (Cl. 260—29.2)

ABSTRACT OF THE DISCLOSURE

Polyurethanes which are prepared by reacting an organic polyisocyanate with an organic compound containing at least two active hydrogen containing groups and a chain-lengthening agent which has at least one active hydrogen containing group and at least one group of formula

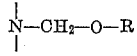

wherein R is a hydrocarbon radical having 1 to 13 carbon atoms. The polyurethanes have good resistance to both water and oil and may be used as coatings or impregnations.

---

This invention relates to polyurethane plastics and more particularly to polyurethane formulations which can be stored as a single component without deterioration and then applied to a substrate where they cure even at room temperature to form films that have good physical properties and which are non-tacky.

It has been proposed heretofore to prepare elastomeric polyurethane films. Depending on the proportions of the components used and particularly the NCO:OH ratio, one can obtain either cross-linked products or predominantly linear products which are not cross-linked and which are therefore soluble in many solvents. Furthermore, in order to prepare products which have good physical properties as solids it has been proposed heretofore to prepare polyurethane plastics having ionic groups, e.g. quarternary ammonium groups or sulphonate groups and then to prepare organic or aqueous solutions or even aqueous dispersions which can be deposited on substrates. Although such polyurethane polyelectrolytes generally have a predominantly linear uncross-linked structure they frequently have, due to their specific physico-chemical character very good properties, especially high tensile strength, hardness and elasticity and their mechanical properties are equal to cross-linked elastomers such as vulcanized rubber. Furthermore, the resistance to water of even the polyurethanes which contain salt-like groups is in most cases surprisingly high although in many cases distinctly inferior to that of non-ionic polyurethanes.

However, the polyurethane having ionic groups have low resistance to aqueous organic solvents such as 70% acetone, 90% tetrahydrofuran, 90% dioxane, or 80% ethylene glycolmonoethy lether acetate. Most polyurethanes containing ionic groups dissolve in such mixtures of organic solvents and water whereas the pure solvents only have a swelling effect. The recognition that such polyurethane polyelectrolytes could be cross-linked especially easily via urethane groups with formaldehyde, compounds which give off formaldehyde or compounds which react like formaldehyde represented an important technical advance. Even polyurethanes built up of polyethers and aromatic diisocyanates can be cross-linked directly in the salt form at 100° C. with formaldehyde.

In practice, however, there are some disadvantages in the formaldehyde cross-linking from the two-component system. Thus, in the process of cross-linking with formaldehyde itself, which is added as an aqueous solution to the polyurethane solutions or dispersions, a certain amount of evaporation of the cross-linking agent invariably takes place so that it is difficult to prepare reproducible products. Films cross-linked with formaldehyde frequently have permanently sticky surfaces. Liquid cross-linking agents such as derivatives of methylolurea, methylolmelamine and the like have the disadvantage of acting as plasticizers in the uncross-linked state, which is a serious disadvantage, for example, during the slow cross-linking of lacquer layers. The advantageous properties for practical use, which are obtained by the cross-linking, for example high mechanical strength and resistance to solvents, in some cases only appear if the cross-linking has been quantitative. In the case of less highly reactive substrates such as only very weakly ionic or non-ionic polyurethanes, this procedure may take a considerable time. In such a case there is, moreover, the danger that the cross-linking agent, if added in relatively high amounts, will react only with itself instead of with the polyurethane. Some cross-linking agents, for example hexamethylol melamine ether, have a weakly basic character and together with the acid catalyst they take on the character of an electrolyte, as a result of which they have a precipitating effect on sensitive dispersions, especially those of a cationic nature. Finally, numerous cross-linking agents are insoluble in water and therefore not very suitable for cross-linking aqueous dispersions.

It is therefore an object of this invention to provide polyurethane plastics which will cure even at room temperature or only slightly elevated temperatures which have exceptionally good physical properties and which are resistant to the action of even aqueous organic solvents. Another object of this invention is to provide ionic polyurethanes which are substantially linear and contain salt-like groups so that they can form aqueous solutions or dispersions and which will still deposit a film that exhibits good physical properties, particularly like those of cross-linked elastomers. Another object of this invention is to provide an improved curing agent for polyurethane plastics. Still a further object of this invention is to provide an improved process for the preparation of polyurethane plastics which may be deposited as elastomers, films, castings, coatings or the like and which have the ability to cure in thin films at relatively low temperatures, which are storage stable and have good shelf life.

The foregoing objects and others which will become apparent from the following description are accomplished in accordance with the invention, generally speaking, by providing polyurethane plastics based on at least one component which contains a N-alkoxy methyl group. Thus, the present invention provides for the preparation of polyurethanes wherein an organic polyisocyanate is reacted with an organic compound containing at least two active hydrogen containing groups as determined by the Zerewitinoff method and at least one compound which contains at least one reactive hydrogen atom and at least one N-alkoxy methyl group. The polyurethanes based on these components are quite stable in storage and capable of curing without the addition of further components, particularly when applied as thin films to substrates.

The subject of the present invention is thus a process for the production of cross-linked synthetic resins, including sheet structures, by the isocyanate polyaddition process based on compounds having reactive hydrogen atoms and preferably a molecular weight of 300 to 20,000, organic polyisocyanates and chain lengthening agents containing reactive hydrogen atoms. The new process is characterized in that the chain lengthening agents are partly or entirely replaced by compounds having at least one reactive hydrogen atom and at least one N-alkoxy methyl group.

Suitable compounds having reactive hydrogen atoms and a molecular weight of 300 to 20,000 and suitable organic polyisocyanates are any of the starting materials customarily used in the isocyanate polyaddition process. Examples are found in German patent specification 1,187,012 and in Belgian patent specification 653,223. Low molecular weights for the starting materials are preferred, especially for the production of hard synthetic resins and sheet structures.

Any suitable polyalkylene ether glycol may be used including those prepared from tetrahydrofuran, propylene oxide, co-polymerization products or graft polymerization products of these compounds such as the products of the addition of the aforementioned polyalkylene oxides and polystyrene and the like. It is also possible to use mixed polyethers obtained, for example, by the condensation of 1,6-hexane diol, 3-methyl-1,6-hexane diol, 1,7-heptane diol, 1,8-octane diol or the like with or without the addition of 10 to 30% of lower glycols such as, for example, ethylene glycol, 1,2-propane diol and the like. In addition, one may use propoxylated and ethoxylated or mixed propoxylated and ethoxylated glycols such as, propoxylated butane diol or ethoxylated amines such as propoxylated N,N'-dimethyl diethylene diamine and the like.

Any suitable polyhydric polythioether may be used, such as, for example, the condensation product of thiodiglycol with itself or with other glycols such as ethylene glycol, 1,2-propylene glycol and the like as well as those which contain tertiary nitrogen atoms, for example, N,N-dihydroxy-p-ethyl-aniline and the like.

Any suitable polyacetal may be used, but it is preferred to use the water soluble types, for example, those from 1,6-hexane diol and formaldehyde, from 4,4'-dihydroxy-ethoxy-diphenyl-dimethyl-methane and formaldehyde and the like.

Any suitable polyester may be used such as, for example, those obtained from polyhydric alcohols and polycarboxylic acids to which diamines and amino alcohols may be added to prepare polyesteramides. Any suitable polyhydric alcohol, but preferably a dihydroxy alcohol such as, for example, diethylene glycol, 1,2-propane diol, 1,4-butane diol, 1,6-hexane diol and the like together with minor amounts of trimethylolpropane, glycerine or the like may be used. Any suitable polycarboxylic acid may be used such as, for example, adipic acid, phthalic acid, terephthalic acid, sebacic acid, suberic acid, azelaic acid or the like together with minor amounts of tricarboxylic acids such as, for example, 1,3,5-benzene tricarboxylic acid and the like. Any suitable diamine such as ethylene diamine or amino alcohol such as ethanol amine may be used.

It is also possible to use polyhydroxyl compounds which contain urethane or urea groups as well as mixtures of the various polyhydroxy compounds including hydrophilic polyethers, such as polyethylene glycol, polyesters and polyacetals. It is preferred to use predominantly hydrophobic polyhydroxyl compounds and hydrophilic polyhydroxyl compounds should only be used in certain proportions which will not harm the final product. In general, less than about 25% of the polyhydroxyl compound should be of the hydrophilic type. It is also possible to use natural polyols such as castor oil, hydroxylated tall oil, carbohydrates and the like.

Any suitable organic polyisocyanate may be used, but it is preferred to use organic diisocyanates and especially aliphatic and aromatic diisocyanates such as, for example 1,5-naphthylene diisocyanate, 4,4'-diphenylmethane diisocyanate, 4,4'-diphenyl-dimethylmethane-diisocyanate, di- and tetralkyl-diphenyl-methane diisocyanate, 4,4'-dibenzyl diisocyanate, 1,3-phenylene diisocyanate 1,4-phenylene diisocyanate, toluylene diisocyanate, chlorinated and brominated isocyanates, isocyanates containing phosphorous, butane-1,4-diisocyanate, hexane-1,6-diisocyanate, dicyclohexylmethane diisocyanate, and cyclohexane-1,4-diisocyanate.

The compounds to be used as chain lengthening agents according to the invention must contain at least one and preferably two reactive hydrogen atoms, e.g. hydroxyl or primary or secondary amino groups; in addition, they must contain at least one N-alkoxy methyl group. The N-alkoxy methyl group corresponds to the following formula $$\overset{|}{\underset{|}{N}}-CH_2-O-R$$

in which R may be either saturated or unsaturated and denote a low or higher alkyl group preferably with 1 to 13 carbon atoms such as methyl, ethyl, propyl, butyl or dodecyl, 2-butenyl, propenyl and the like.

Compounds of this type include, e.g. the following classes of compounds: N-alkoxymethylurea, N-alkoxymethylurethanes, N-alkoxymethylamides, N-alkoxymethyl-thioureas, N-alkoxymethylguanidines, N-alkoxymethylmelamines and N - alkoxymethyltetrahydropyrimidinones, each of these compounds containing in addition at least one group which is reactive with isocyanates. The following are examples of such compounds:

(1) Adducts of alkoxymethylisocyanates to compounds having at least two reactive hydrogen atoms, $NH_2-CH_2-CH_2-NH-CH_2-CH_2-NH-CO-NH-CH_2-O-CH_3$
$HO-CH_2-CH_2-NH-CH_2-CH_2-NH-CO-NH-CH_2-O-CH_3$

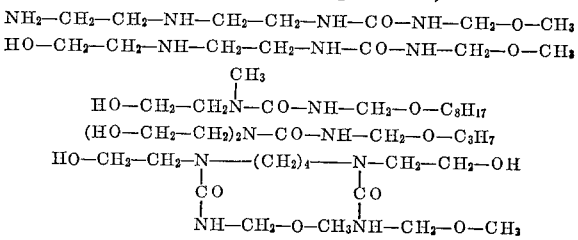

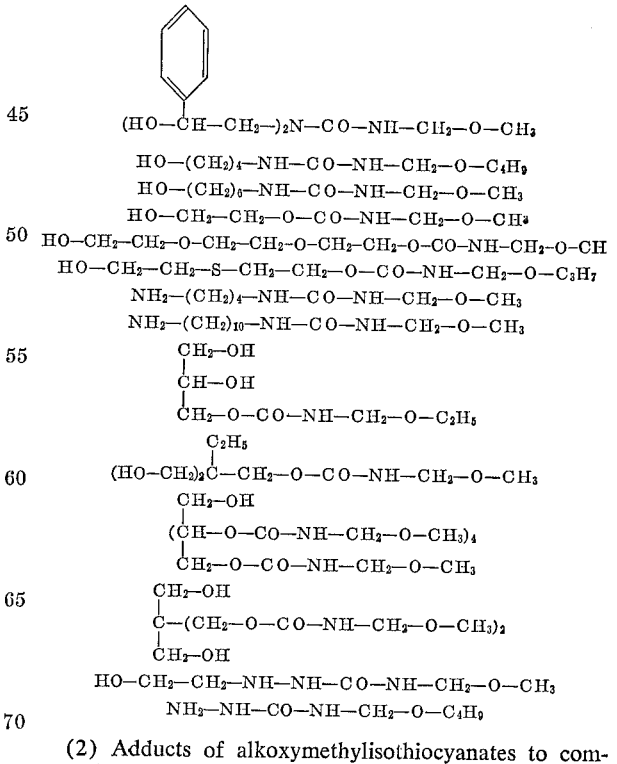

(2) Adducts of alkoxymethylisothiocyanates to compounds having at least two reactive hydrogen atoms, $(HO-CH_2CH_2)N-CS-CS-NH-CH_2-O-CH_3$
$NH_2-(CH_2)_6-NH-CS-NH-CH_2-O-CH_3$ (3) Adducts of alkoxymethylcarbodiimides to compounds having at least two reactive hydrogen atoms,

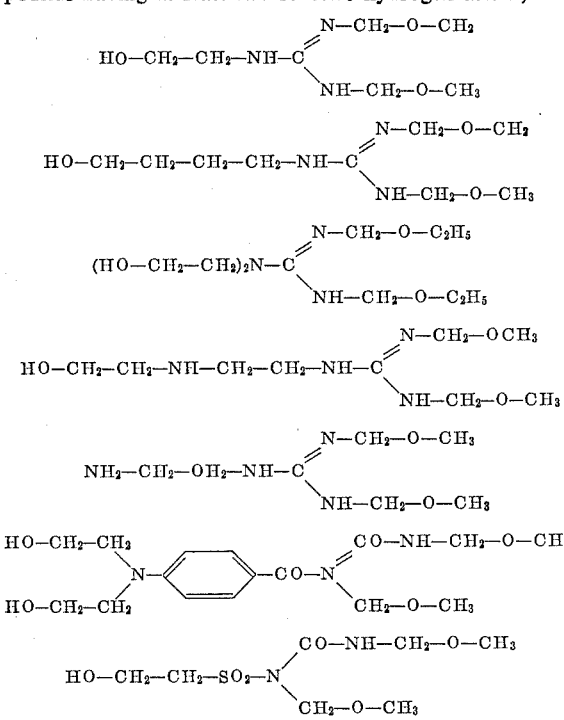

(4) Adducts of aminopolyols to N-alkoxy-methyl derivatives of polymerizable monomers,

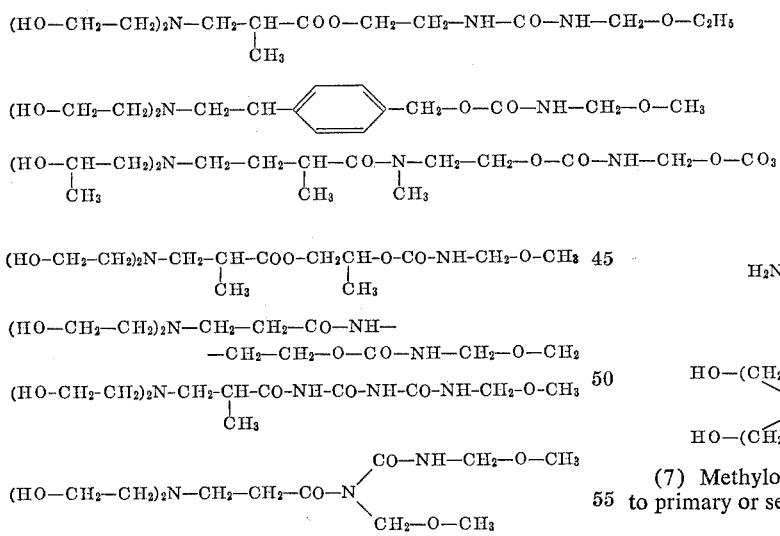

(5) Reaction products of methylolethers with polyhydroxyl compounds. In this case, mixtures are generally formed,

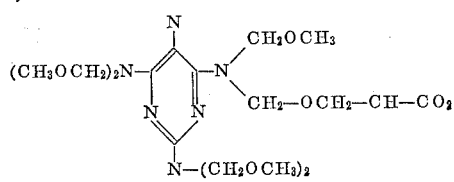

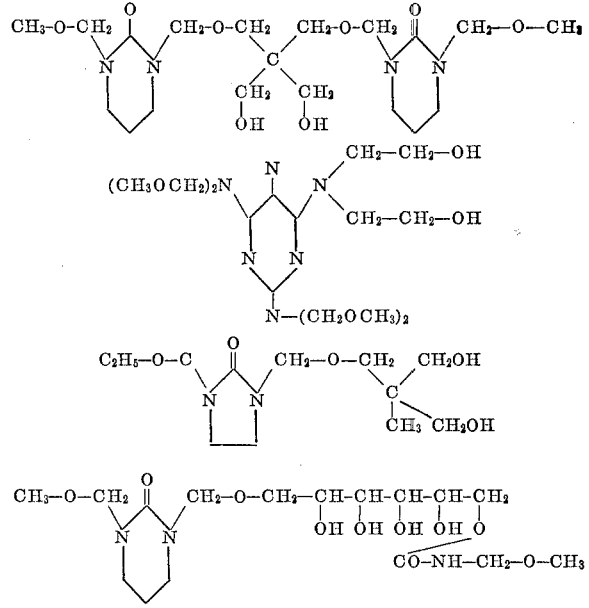

(6) Reaction products of amides or ureas with formaldehyde/alcohols

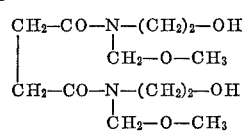

(7) Methylolethers of the adducts of glycol carbonate to primary or secondary amines

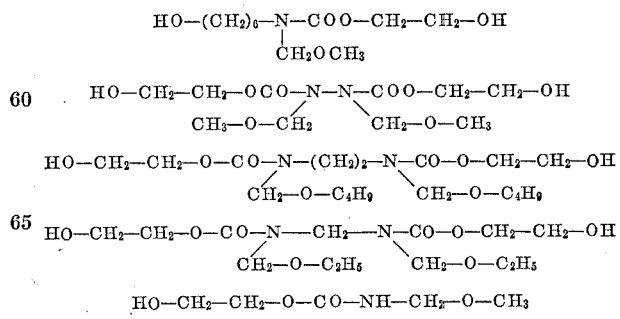

Preferred N-alkoxy methyl compounds are the adducts of alkoxymethylisocyanates to low molecular weight compounds having at least two OH and/or NH₂ groups, e.g. diethanolamine, diisopropanolamine, diethylenetriamine, pentaerythritol, alkylene-bis-(N-alkoxymethylhydroxyethylurethane) and the adducts of alkoxymethyl-(meth)-acrylamide and (meth)-acrylic acid hydroxypropyl ester methoxymethylurethane to diethanolamine.

In these cases, the reactivity of the alkoxymethyl group during the cross-linking reactions is determined both by the size of the alkoxy radical and by the groups that are in the delta-position to this radical. Thus the reactivity decreases from methoxy to dodecyloxy, whereby the reactivity can be adjusted very accurately during the subsequent self-cross-linking. On the other hand, alkoxymethylureas are distinctly more reactive than alkoxymethylurethanes or alkoxymethylamides.

The incorporation of the N-alkoxy methyl compounds into the polyurethanes is carried out by the method customarily employed for chain lengthening agents. For example, the N-alkoxy methyl compound may be reacted with are polyisocyanate together with the polyhydroxy compound but it is preferable first to prepare an adduct from the polyhydroxy compound and the polyisocyanate and then to react this with the N-alkoxy methyl compound.

Whichever method is used, care must be taken to ensure that the N-alkoxy methyl compound will not develop its cross-linking action during the process of incorporation, i.e. during the preparation of the polyurethane. This is achieved by one or other or several of the following measures:

(1) Observing low temperatures, preferably below 100° in the case of methoxymethylureas and below 120° in the case of higher alkoxymethylurethanes;

(2) Preferably by carrying out the polyaddition in the presence of inert solvents such as benzene, toluene, chlorobenzene, acetone, methyl ethyl ketone, diisopropyl ketone, lower carboxylic acid esters, dioxane, acetonitrile, tetrahydrofuran, dimethylformamide, dimethylacetamide, dimethylsulphoxide, methylene chloride or chloroform; the solvents may contain small quantities of water, e.g. up to 1%.

(3) Maintaining a neutral to slightly basic reaction in the medium and excluding acids or substances which lower the pH. If acidic substances are present, the acidity must be reduced with bases, e.g. with MgO, ZnO, $CaCO_3$ or tertiary amines. It is especially advantageous to include chain lengthening agents which have tertiary amino groups, e.g. N-methyl-diethanolamine or N-cyclohexyl-diisopropanolamine, to ensure a slightly basic reaction medium during the entire reaction. The same purpose is fulfilled by the incorporation of carboxylic acid salts, e.g. the sodium or triethylamine salt of tartaric acid.

These conditions however are not essential requirements which must all be fulfilled. Thus, if the reaction is sufficiently basic, the reaction may be carried out at temperatures above 120° C. or without a solvent. Conversely, in some cases the reaction can be carried out in a slightly acid medium (pH 6) if the reaction temperature is sufficiently low and the N-alkoxy methyl compound chosen is not too reactive.

According to a preferred embodiment, a preadduct is prepared from a polyhydroxyl compound and a polyisocyanate without the use of a solvent at temperatures between 70° C. and 150° C. and then reacted at 20° C. to 80° C. with the N-alkoxymethyl compound with the addition of solvent. As the reaction progresses, which can be observed by the increase in viscosity of the solution, more solvent is added and eventually a solution having a solids content e.g. between 20 and 70% and a viscosity between 1 and 1000 stokes is obtained.

It is possible to include the usual chain lengthening agents. Suitable examples of these are those customarily used in the isocyanate addition process, which have a low molecular weight and contain at least two reactive hydrogen atoms, are diols, triols, diamines, amino alcohols, hydrazines and water. Examples are found in German patent specification 1,187,012 and in Belgian patent specification 953,223. Especially worth mentioning as chain lengthening agents are compounds which are particularly reactive to N-alkoxy methyl groups, e.g. glycols containing acid amide groups, N,N'-dihydroxyethyl-hexamethylene-bis-urea, N,N'-bis-(2-aminoethyl)-oxamide, carbodihydrazide, hexane-bis-semicarbazide, grammahydroxybutyric acid hydrazide, bis-amino-sulphonyl-methane, - 4,4'-bis (aminomethyl)-dibenzyl-methylamine, hydroquinone-bis-hydrazine-ethyl-ether, isobutylidenediureide, dihydroxyethylaniline, dihydroxyethyl-m-toluidene, N,N-bis-aminopropyl-m-toluidine, N,N-dihydroxyethylurea, N,N-bis-(hydroxyethyl)-melamine.

In general, the reaction components used as well as the N-alkoxy-methyl compound will be predominantly bifunctional so that a polyurethane mass of linear structure is obtained. The preferred molecular weight of the polyurethane mass depends on the quantity of incorporated N-alkoxy-methyl compound, a quantity which can be varied within wide limits. When small quantities of N-alkoxymethyl compound are incorporated, e.g. to 2–10 mval./ 100 g., a high molecular weight, e.g. above 20,000, is desirable. Products which contain a high proportion of cross-linking agent, e.g. 80 to 300 mval./100 g., may also be produced at relatively low molecular weights, i.e. with molecular weights between 3,000 and 10,000. Where the molecular weights are as low as this, the products may also be branched to a certain extent without swelling occurring. Thus, it is also possible to use oligofunctional and monofunctional reaction components.

Finally, it is possible to prepare a linear or branched, more or less high molecular weight polyurethane having terminal isocyanate groups and to react this with an N-alkoxymethyl compound which is monofunctional towards isocyanate groups, e.g. N-methoxymethyl-N-hydroxybutyl-urea.

The polyurethanes which are modified with N-alkoxymethyl compounds are preferably of the kind which in addition contain salt-type groups which may be either anionic or cationic.

The preparation of such ionic polyurethanes and their conversion into aqueous colloidal solutions or dispersions, which are of special interest for the present invention, have been described, e.g. in German Auslegeschriften 1,184,946; 1,178,586 and 1,179,363. In the preparation of such cationic polyurethanes it is advantageous to carry out the salt formation with quaternizing agents or acids only after the polyaddition is terminated.

Thus, the preadduct containing the isocyanate groups is reacted simultaneously or successively with the basic glycol or diamine required for the subsequent salt-formation, e.g. with the N-methyldiethanolamine, N-cyclohexydiisopropanolamine, gamma, gamma-bis-amino-propyl-methylamine or a sulphide such as thiodiglycol and with the N-alkoxymethyl compound, and, if desired, other chain lengthening agents. At this stage, the reaction mass is substantially insensitive to premature cross-linking. The salt formation with the aid of alkylating agents or acids is then carried out under mild conditions (e.g. 30 to 70°) so that the pH of the reaction medium does not drop below 3 and preferably a small proportion (e.g. 5%) of the tertiary amino groups remains unchanged. This is always the case, e.g. when salt formation is carried out by means of weak acids such as acetic acid even if an excess of acetic acid is employed. Such a solution can subsequently be converted into an aqueous colloidal solution or into a dispersion. Such aqueous colloidal heterogeneous systems are indefinitely stable on storage even at pH values of 3.

The preparation of self-cross-linking cationic polyurethane dispersions may also be carried out by a different method, e.g. by incorporating in addition to the N-alkoxy methyl compound, a reactive halogen diol (adduct of a chloromethyl-aryl-isocyanate with diethanolamine) and reacting this with a tertiary amine or a sulphide before transfer into the aqueous medium. Also, the high molecular weight polyurethane mass which contains N-alkoxy methyl groups and which is incapable of self-cross-linking may subsequently be reacted with compounds which impart a salt-type character to it, for example with beta-chloroethyl isocyanate and pyridine. Cross-linking takes place under particularly mild conditions if the alkylating agents used are partly or entirely compounds which have advantageous acceptor properties towards alkoxy methyl groups, e.g. chloroacetamide or bromoacetamide.

In the preparation of polyurethanes with anionic groups, the preadduct containing isocyanate groups is generally first reacted with the N-alkoxy methyl compounds and subsequently with the salt-type components or components capable of salt formation. In principle, the reverse procedure may also be used provided care is taken to ensure that no free acid groups not converted into salt are present. Examples of salt-type components suitable for incorporation are salts of taurine, methyltaurine, tartaric acid, citric acid, lactic acid, mannitol pre-acid, 4,6-dihydroxyisophthalic acid, 6-aminocaproic acid, diaminobenzoic acid, hydrazinic disulphonic acid, salts of addition comopunds of unsaturated acids, cyclic dicarboxylic acid, anhydrides, lactones, sultones, or cyclic sulphates with aliphthatic and aromatic diamines or aminodiols such as aminoethyl-aminopropane sulphonic acid or N,N-bis-hydroxyethyl-aminopropionic acid.

The reaction with compounds which impart a salt-type character to the polyurethane mass, for example compounds such as sultones, beta-propiolactone, cyclic sulphates or dicarboxylic acid anhydrides, may also be carried out subsequently on the high molecular weight product.

As is known from the isocyanate polyaddition process, the proportions of the components may vary within wide limits depending on whether soft, flexible, elastic or very hard synthetic resins are to be prepared. In the last mentioned case, the quantity of higher molecular weight compounds, e.g. polyhydroxyl compound, need not be more than 10% of the total quantity.

It is surprising that even the incorporation of such highly reactive N-methylolether ethers may be carried out without premature cross-linking although when such an uncross-linked polyurethane is applied from an aqueous dispersion on to a substrate, it readily yields a cross-linked sheet structure on evaporation of the water, even at room temperature, although N-alkoxymethyl groups are also capable of reacting with NCO groups. In fact, noncross-linked polyurethanes having reactive N-alkoxy methyl groups are first obtained which cross-linked under the desired conditions, e.g. increase of temperature, change in pH or removal of the solvent or dispersing agent.

Under favorable conditions, cross-linking takes place immediately during drying of a solution or dispersion at room temperature. In other cases, the dry or still moist layers have to be reheated at about 40 to 150° C. for about 2 to 60 minutes.

Cross-linking is favored by low pH, alkoxy methyl urea groups, high urethane group content, aliphatic polyisocyanates as reaction components, the presence, if possible, of more favorable acceptor groups than urethane groups, e.g. urea carbonamide-hydrazide groups.

In the case of the above described conversion of cationic or anionic polyurethanes, it is generally the case that the more strongly marked the salt-type character of a cationic or anionic polyurethane, the milder may be the subsequent conditions for cross-linking. The minimum conditions for any individual case can easily be determined by a preliminary test. For this purpose, samples of the solution or dispersion of the polyurethane mass in water and/or organic solvents are adjusted to pH values between 7 and 2, e.g. by means of ammonia, acetic acid or formic acid, poured on to supports and dried at room temperature. The dried samples are divided up and reheated at 50°, 80°, 100° and 120° C. respectively. Insolubility in 80 to 90% aqueous tetrahydrofuran indicates that cross-linking has taken place.

The products of the process, which have good resistance to water and oil even if they are hydrophilic, are used especially as sheet structures, particularly as coatings and impregnations for many different types of substrates and for elastic films and foils. They are equally suitable as adhesifying agents and for shaped structures such as filaments. The final coated filaments can be used to prepare clothing.

The invention is further illustrated by the following examples in which the parts are by weight unless otherwise indicated.

Example 1

About 250 g. of a polyester of adipic acid, neopentyl glycol and hexanediol (0.143 mol) are reacted, after dehydration at about 120° C. with about 43.2 g. of 1,6-hexamethylenediisocyanate for one hour. A solution of about 5 g. of N-methyl-diethanolamine and about 10 g. of the addition product of 1 mol of methoxymethyl isocyanate and 1 mol of diethanolamine in 200 cc. of acetone is then added at about 35° C. After stirring for about 7 hours at about 50° C. the reaction mixture is diluted with about 380 cc. of acetone.

The water-clear, viscous polyurethane solution obtained is stirred with about 2 cc. of dimethylsulphate for about 30 minutes at about 50° C. and then treated with about 2 cc. of glacial acetic acid. About 500 cc. of water are stirred into this mixture and acetone is distilled off. A viscous, opaque, aqueous colloidal 43% polyurethane solution is obtained which has a pH of 5 and is stable during storage for over one year. The solution dries at room temperature to form a transparent, high tensile strength, elastic and non-sticky foil which is insoluble in 90% tetrahydrofuran.

Example 2

The procedure is the same as in Example 1 except that only about 1 cc. of dimethyl sulphate is used. A 44% polyurethane dispersion which is highly fluid, milky white and stable is obtained. If the pH of such a dispersion is adjusted to 3 with formic acid, it dries at room temperature to form an elastic foil of high tensile strength which is not soluble in 90% tetrahydrofuran. A sample which has not been acidified dries to form a sticky film which undergoes cross-linking only after several weeks.

Example 3

About 500 g. of polypropylene glycol (OH number 56) are dehydrated and treated at about 100° C. with about 77.4 g. of 1,6-hexamethylene diisocyanate. The temperature is raised to about 130° C., 2 drops of dibutyl tin dilaurate are added and after about one hour the reaction mixture is cooled to about 70° C. The melt is already highly viscous at this temperature and a solution of about 6 g. N-methyldiethanolamine and about 4.7 g. of the addition product of 1 mol methoxymethylisocyanate and 1 mol diethanolamine in about 350 cc. of acetone are poured all at once into the melt. After about 2 hours stirring at about 60° C. the mixture is diluted with about 600 cc. acetone.

About 2.3 cc. dimethylsulphate are added, the mixture stirred for about 30 minutes at about 50° C., about 2 cc. glacial acetic acid are added and about 1 liter of water is then stirred into the reaction mixture in the course of about 10 minutes. After the addition of two drops of silicone defoaming agent, the acetone is rapidly distilled off in a water jet vacuum.

A 38% polyurethane dispersion is obtained which is relatively coarsely dispersed but does not form sediment and which dries to form cloudy, sticky coatings. After adjustment to pH 3 by means of acetic acid, coatings are obtained which although still sticky on the surface are cross-linked and insoluble in 90% tetrahydrofuran.

Example 4

About 500 g. of the polyester of Example 1 are stirred for about 1.5 hours at about 120° C. with about 77 g.

1,6-hexamethylenediisocyanate. About 9.4 g. of the adduct of 1 mol of methoxymethylisocyanate and 1 mol of diethanolamine are added at about 70° C. and the mixture stirred for a further 30 minutes. About 73 g. of a 20% solution of taurine sodium in water and about 800 cc. acetone are then added. As soon as the solution is highly viscous, about 700 cc. water are stirred in and the acetone distilled off in vacuo. A viscous, 44.5% polyurethane dispersion is obtained which has a pH of 7.

To investigate how onset of cross-linking depends on pH and temperature, 90% acetone is added to samples treated under various conditions. Non-cross-linked samples dissolve, cross-linked samples swell to a greater or less extent. The results are shown in the following table.

|  | pH=7 | pH=4 (acetic acid) | pH=3 (formic acid) |
| --- | --- | --- | --- |
| 20° | Soluble | Cross-linked | Strongly cross-linked. |
| One-half hour at 80° | do | do | Do. |
| One hour at 100° | do | do | Do. |
| One hour at 120° | Cross-linked | do | Do. |

Example 5

About 125 g. of polypropylene ether glycol (OH number 56) are reacted for about 30 minutes at about 120° C. with about 57 g. of a mixture of 65% 2,4- and 35% 2,6-toluylene diisocyanate. The reaction mass is cooled to about 40° C. and about 20 g. N-methyldiethanolamine and about 30 g. of the adduct of methoxymethylisocyanate and diethanolamine in about 196 cc. acetone are added within about 10 minutes, reaction taking place with formation of cloudiness and rise in temperature. The reaction mixture is stirred for a further 5 hours at about 50° C.

About 100 g. of the 60% polyurethane solution obtained are treated at about 50° C. with about 0.82 cc. dimethylsulphate (20% of the quantity required for complete quaternization); about 8 cc. glacial acetic acid and about 150 cc. water are then added. When the acetone has been distilled off, an aqueous colloidal, 21% polyurethane solution of pH 4.5 is obtained. When dried on a surface, a sticky layer is obtained which crosslinks to form an elastomer of high tensile strength when subsequently heated to about 80° C. If the solution is adjusted to pH 3 with formic acid before it dries, cross-linking already takes place at about 50° C.

Example 6

About 212.5 g. of polyester of adipic acid, hexanediol and neopentyl glycol (OH number 65.85) are dehydrated at about 120° C. for about 30 minutes in a water jet vacuum and treated with about 52.0 g. 1,6-hexane diisocyanate. The melt is kept at about 120° C. for about 2 hours and then reacted with about 15 g. of an adduct of equimolar quantities of methoxymethyl isocyanate and diethanolamine at about 90° C. for about 2 hours. The melt is taken up with about 50 ml. acetone and treated with a mixture of about 3.76 g. ethylene diamine, about 7.63 g. propane sultone and about 35 ml. of 10% aqueous potassium hydroxide solution in about 50 ml. water. After the addition of about 515 ml. water, the acetone is distilled off. A stable dispersion having a solids content of 38.0% is obtained. The latex dries at about 140° C. to form clear, transparent films of high tensile strength which are insoluble in the usual solvents.

Example 7

After dehydrating, about 218.5 g. of a polyester of adipic acid, 1,6-hexanediol and neopentyl glycol (OH number 63) for about ½ hour at about 120° C./12 mm. Hg, it is reacted with about 33.6 g. 1,6-hexane diisocyanate at about 120° C. to form an adduct which is reacted at about 70° C. with about 4.1 g. of an adduct of equimolar quantities of diethanolamine and methoxymethyl isocyanate. The melt is taken up in about 320 ml. acetone and treated at about 55° C. with about 31.9 g. of a 20% aqueous taurine sodium solution. After the addition of about 380 ml. water, the acetone is distilled off. By drying the resulting dispersion at elevated temperatures, cross-linked films are obtained which are insoluble in dimethylformamide.

Example 8

About 218.5 g. of a polyester of adipic acid, 1,6-hexanediol and neopentyl glycol (OH number 63) are dehydrated and reacted as in Example 2 with about 37.5 g. hexanediisocyanate, about 8.4 g. of the adduct of equimolar quantities of dithanolamine and methoxyethylisocyanate and about 32.2 g. of a 29% aqueous tourine sodium solution. After the addition of about 650 ml. water, the organic solvent is distilled off in vacuo and the pH of the latex obtained is adjusted to 4 by the addition of about 0.8 ml. formic acid. The latex is poured out to form films which are dried at room temperature to form clear, insoluble foils of high tensile strength.

The following mechanical properties are determined:

Tensile strength _____kg. wt./cm.$^2$__ 120
Tension at 100% _____kg. wt./cm.$^2$__ 11.1
Tension at 500% _____kg. wt./cm.$^2$__ 38
Elongation on tearing _____percent__ 830
Resistance to tear propagation _____kg. wt./cm.__ 16
Permanent elongation at break after 1 minute _____percent__ 35

When a comparison test is carried out according to Example 7 with a polyurethane latex prepared from about 30.5 g. 1,6-hexane diisocyanate but without the use of the adduct of equimolar quantities of diethanolamine and methoxymethyl isocyanate as the formaldehyde-splitting agent which can be incorporated, the polyurethane latex yields, on drying, foils which have a tensile strength of only 73 kg. wt./cm.$^2$ and which are soluble in aqueous acetone and in dimethylformamide.

Eaxample 9

The procedure is the same as in Example 5 except that about 39.5 g. methylene-bis-(N-methoxymethyl-beta-hydroxyethylurethane) are used as cross-linking component.

About 100 g. of the 60% polyurethane solution obtained are heated for 3 hours at about 60° C. with about 2.8 g. of chloroacetamide (70% of the quantity required for complete quaternation). The solution is treated with 2 cc. acetic acid and 100 cc. water and adjusted to pH 2 wtih formic acid. The acetone is then distilled off. The aqueous colloidal solution dries to form a soft, sticky mass which when subsequently heated to about 90° C. cross-links to form a detachable film which is insoluble in acetone.

Example 10

About 125 g. polypropylene ether glycol of OH number 56 are reacted for about 30 minutes at about 120° C. with about 26.8 g. of 65% 2,4- and 35% 2,6-toluylene diisocyanate. At about 40° C., the solution of about 28.0 g. of the adduct of diethanolamine and N-methoxymethylmethylacrylamide in about 100 cc. acetone is added and after about 6 hours stirring at about 50° C. the solution is diluted to 60%.

About 100 g. of this solution are heated with about 2.02 cc. dimethyl sulphate (50% of the quantity for complete quaternization) for about 30 minutes at about 50° C., the solution is treated with about 1.9 cc. of acetic acid and 100 cc. of water, and the acetone is distilled off. The pH is then adjusted to 2 with formic acid. The mass, which on first drying is soft and sticky, forms a film after about 2 hours heating at about 130° C. and is then insoluble in acetone.

Example 11

The procedure is the same as in Example 5 except that about 26.6 g. of the adduct of equimolar quantities of diethanolamine and methoxymethylisothiocyanate are used as cross-linking component.

(a) About 100 g. of the 60% polyurethane solution obtained are heated with about 0.83 cc. dimethylsulphate (20% of the quantity required for complete quaternization) for about 30 minutes at about 50° C., and about 3 cc. glacial acetic acid and about 100 cc. water are then added. The pH of the aqueous dispersion obtained when the acetone has been distilled off is adjusted to 2 with formic acid and dries to form a plastic mass. When subsequently heated at about 80° C. this becomes hard and brittle.

(b) The procedure is the same as above but with the use of about 2.1 cc. dimethylsulphate (50% of the theoretical quantity). A hard, brittle film is obtained even at 50° C.

(c) The procedure is the same as above but with the use of about 2.9 g. chloroacetamide (70% of the quantity required for complete quaternization) and only a part of the acetone is distilled off. The aqueous acetonic solution dries to form a plastic mass which when subsequently heated at about 50° C. yields an elastic film which, however, is still soluble in tetrahydrofuran to form a colloidal solution. When it has been heated at about 80° C. however it is insoluble.

Example 12

The procedure is the same as in Example 5 but with the use of about 30.5 g. of the adduct of equimolar quantities of diethanolamine and iso-butoxymethyl isocyanate. Also, 1,6-hexamethylene diisocyanate is used instead of toluylene diisocyanate.

(a) About 100 g. of the 60% polyurethane solution are quaternized with about 0.83 cc. dimethylsulphate, and about 3 cc. glacial acetic acid and about 100 cc. water are added. The acetone is distilled off. After the pH has been adjusted to 2, the aqueous colloidal polyurethane solution dries at about 50° C. to form a soft, elastic film which is insoluble in tetrahydrofuran.

(b) The same result is obtained when about 2.1 cc. dimethylsulphate and about 1.9 cc. glacial acetic acid are used. The foils have a slightly higher elasticity. If the pH is adjusted to 3, an after-heating temperature of about 90° C. is necessary to obtain the same result.

(c) When about 2.9 g. chloroacetamide are used instead of dimethylsulphate and the pH is 2, the cross-linking sets in even at about 35° C.

Example 13

The procedure is the same as in Example 5 except that about 44.5 g. of the adduct of diethanolamine and dodecylhydroxymethylisocyanate are used and 1,6-hexamethylene diisocyanate is used instead of toluylene diisocyanate. 100 g. of the 60% polyurethane solution are quaternated with about 0.8 cc. dimethyl sulphate and treated with about 3 cc. glacial acetic acid and about 100 cc. water. When the acetone has been distilled off, an opaque, aqueous colloidal polyurethane solution remains behind which is adjusted to pH 3 with acetic acid. The solution dries at room temperature to form a clear, extremely soft film which is rendered insoluble in tetrahydrofuran by after-heating at about 50° C.

Example 14

The procedure is the same as in Example 5 but with the use of about 48.5 hexamethylene-bis-(N-methoxymethyl-beta-hydroxyethylurethane) as cross-linking component.

About 100 g. of the 60% polyurethane solution are quaternated with about 2.9 g. chloroacetamide (70% of the quantity required for complete quaternization) for about 3 hours at about 60° C. and treated with about 2 cc. glacial acetic acid and about 100 cc. water. When the acetone has been distilled off, a viscous, opaque, aqueous colloidal polyurethane solution remains behind which dries at about 110° C. to form an insoluble film.

Example 15

The procedure is the same as in Example 5 but with the use of about 41.3 g. ethylene-bis-(N-methoxymethyl-beta-hydroxyethyl urethane) as cross-linking component and the use of 1,6-hexamethylenediisocyanate instead of toluylene diisocyanate.

About 100 g. of the 60% polyurethane solution are stirred with about 2.0 cc. dimethylsulphate (50% of the quantity required for complete quaternization) for about 30 minutes at about 50° C. About 1.8 cc. glacial acetic acid and about 100 cc. water are then added, the acetone is distilled off in vacuo and the aqueous colloidal solution adjusted to pH 4 with acetic acid. Drying of the solution and after-heating at about 150° C. yields an elastic film which is insoluble in tetrahydrofuran.

Example 16

The procedure is the same as in Example 5 but with the use of about 45 g. tetramethylene-bis-(N-methoxymethyl-beta-hydroxyethylurethane) as cross-linking component.

About 100 g. of the 60% polyurethane solution are stirred with about 2.8 g. chloroacetamide (70% of the quantity required for complete quaternization) for about 3 hours at about 60° C. and about 2 cc. glacial acetic acid and about 100 cc. water are added to the solution. When the acetone has been distilled off, a viscous opaque, aqueous colloidal polyurethane solution is obtained which dries at room temperature to form a plastic, sticky mass. After-heating at about 100° C. yields a film which is insoluble in acetone.

Example 17

About 200 g. polypropylene glycol of molecular weight about 2000 are dehydrated at about 120° C. and then reacted with about 77 g. 4,4'-diphenylmethane diisocyanate. After a reaction time of about 30 minutes, the melt is cooled to about 60° C. and treated with about 20 g. N-methyldiethanolamine and about 7 g. of the adduct of diethanolamine and N-methoxymethylmethacrylamide; during this operation, the temperature should not rise above about 90° C. The melt, which rapidly becomes more viscous, is after-heated in molds for about 10 hours at about 100° C., a plastic, rubbery mass being formed. This is rolled out into a sheet and dissolved in acetone to form a 33% solution. The solution is stirred with 30 cc. methyl chloride for 5 hours at 80° C. in an autoclave and adjusted to pH 3 with aqueous hydrochloric acid. When dried at 100° C. it yields an elastic film which is insoluble in organic solvents.

Example 18

About 100 g. polypropylene ether glycol of OH number about 300 are dehydrated for about 2 hours at about 120° C. and then reacted with about 101 g. 1,6-hexamethylene diisocyanate. A solution of about 108 g. ethylene-bis-CN-methoxymethyl-beta-hydroxy-ethylurethane) in about 100 cc. tetrahydrofuran is added to this melt at about 40° C. After the addition of about 2 drops of dibutyl tin dilaurate, the solution gradually becomes more viscous. With increasing viscosity, the solution is diluted with more tetrahydrofuran until the solids content is about 40%.

A sample of the solution is adjusted to pH 2 with formic acid and dried at about 130° C. A hard film, insoluble in organic solvents, is obtained.

It is to be understood that the foregoing working examples are given for the purpose of illustration and that any other suitable polyisocyanate, organic compound containing at least two active hydrogen containing groups, chain lengthening agent or compound having an N-alkoxymethyl group could be used provided that the teachings of this disclosure are followed.

Although the invention has been described in con-

What is claimed is:
1. A polyurethane plastic prepared by a process which comprises reacting an organic polyisocyanate, an organic compound containing at least two active hydrogen containing groups as determined by the Zerewitinoff method and a chain-lengthening agent containing at least one active hydrogen group and at least one group having the formula:

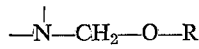

where R is a hydrocarbon radical having 1 to 3 carbon atoms.

2. The product of claim 1 wherein said chain lengthening agent is an adduct of an alkoxy methyl isocyanate and a compound containing at least two reactive hydrogen atoms as determined by the Zerewitinoff method.

3. The product of claim 1 wherein said organic compound containing at least two active hydrogen atoms as determined by the Zerewitinoff method is a polyhydric polyether.

4. The product of claim 1 wherein said organic compound containing at least two active hydrogen containing groups as determined by the Zerewitinoff method is an hydroxy polyester prepared by a process which comprises reacting an excess of a polyhydric alcohol with a polycarboxylic acid.

5. The product of claim 1 wherein said organic polyisocyanate is an organic diisocyanate, said organic compound containing at least two active hydrogen containing groups is a polyhydric polyalkylene ether or a polyhydric polyester and said chain lengthening agent is an adduct of an alkoxy methyl isocyanate and a di(hydroxyalkyl) amine.

6. An aqueous dispersion comprising water and a polyurethane prepared by including a salt-forming component in the reactants used to prepare the polyurethane of claim 1.

7. The product of claim 1 wherein said organic polyisocyanate and said organic compound containing at least two active hydrogen containing groups as determined by the Zerewitinoff method are reacted in a first step to prepare a product having free —NCO groups and the resulting product is reacted with said chain-lengthening agent in a second step.

References Cited

UNITED STATES PATENTS

| | | | |
|---|---|---|---|
| 2,850,474 | 9/1958 | Maxey | 260—75 |
| 2,929,800 | 3/1960 | Hill | 260—77.5 |
| 3,095,385 | 6/1963 | Wagner | 260—2 |
| 3,121,748 | 2/1964 | Gey et al. | 260—584 |
| 3,321,415 | 5/1967 | Hennig et al. | 260—2.5 |
| 3,346,517 | 10/1967 | Kamal | 260—2.5 |

FOREIGN PATENTS 992,373  5/1965  Great Britain.

DONALD E. CZAJA, *Primary Examiner.*

F. McKELVEY, *Assistant Examiner.*

U.S. Cl. X.R.

260—67, 75, 18, 24; 117—161; 260—553, 554, 556, 552, 551, 559, 77.5, 482, 251, 256.4, 309, 564